(12) United States Patent
Giacomelli et al.

(10) Patent No.: US 12,166,863 B2
(45) Date of Patent: Dec. 10, 2024

(54) MULTIPARTY COMPUTATION METHOD

(71) Applicant: Intesa Sanpaolo Innovation Center S.p.A., Turin (IT)

(72) Inventors: Irene Giacomelli, Turin (IT); Mario Di Raimondo, Turin (IT); Dario Catalano, Turin (IT); Laura Li Puma, Turin (IT); Valeria Ricci, Turin (IT); Roberto Giorgetti, Turin (IT)

(73) Assignee: Intesa Sanpaolo Innovation Center S.p.A., Turin (IT)

( * ) Notice: Subject to any disclaimer, the term of this patent is extended or adjusted under 35 U.S.C. 154(b) by 199 days.

(21) Appl. No.: 17/777,326

(22) PCT Filed: Nov. 18, 2020

(86) PCT No.: PCT/IB2020/060854
§ 371 (c)(1),
(2) Date: May 17, 2022

(87) PCT Pub. No.: WO2021/099954
PCT Pub. Date: May 27, 2021

(65) Prior Publication Data
US 2022/0417003 A1 Dec. 29, 2022

(30) Foreign Application Priority Data
Nov. 19, 2019 (IT) .................. 102019000021576

(51) Int. Cl.
*H04L 29/06* (2006.01)
*H04L 9/06* (2006.01)
*H04L 9/08* (2006.01)

(52) U.S. Cl.
CPC ............ *H04L 9/085* (2013.01); *H04L 9/06* (2013.01); *H04L 2209/46* (2013.01)

(58) Field of Classification Search
None
See application file for complete search history.

(56) References Cited

U.S. PATENT DOCUMENTS

| | | | |
|---|---|---|---|
| 7,929,691 B2* | 4/2011 | Harrison | H04L 9/3073 713/150 |
| 7,937,270 B2* | 5/2011 | Smaragdis | H04L 9/008 704/256 |
| 8,805,915 B2* | 8/2014 | Yu | G06F 7/5443 708/501 |

(Continued)

FOREIGN PATENT DOCUMENTS

WO  WO2019/046651  3/2019

OTHER PUBLICATIONS

Search Report, Written Opinion dated Mar. 9, 2021; Application No. PCT/IB2020/060854; 13 pages.

(Continued)

*Primary Examiner* — Maung T Lwin
(74) *Attorney, Agent, or Firm* — Erik J. Overberger; RANKIN, HILL & CLARK LLP

(57) ABSTRACT

A method of multi-party computation, for processing and secure handing of a plurality of data associated with one or more users, comprising the steps of: providing a predetermined multi-party computation algorithm; each user being able to send a first dataset to a data processing unit via a respective second data processing unit distinct from the first data processing unit and in signal communication with the first data processing unit; each first dataset being associated with the user and comprising one or more encrypted numerical values; processing each first dataset that has been sent using at least one reference function residing in the first data processing unit to generate a respective encrypted result for each reference function; requesting the first data processing unit to send the result using a predetermined function shared by the users and a respective second data processing unit sending the result to the second requesting data processing (Continued)

unit; wherein the step of sending the first dataset comprises the substeps of detecting the presence of decimal numerical values and integer numerical values among the numerical values of the first dataset; associating an integer mantissa and an exponent of a floating-point representation with each decimal numerical value that has been detected; encrypting each integer numerical value and each mantissa using the predetermined multi-party computation algorithm.

10 Claims, 1 Drawing Sheet

(56) References Cited

U.S. PATENT DOCUMENTS

| | | | |
|---|---|---|---|
| 10,878,950 B1* | 12/2020 | Jun ................... | G06Q 40/08 |
| 2013/0262539 A1* | 10/2013 | Wegener ............ | G06F 7/483 |
| | | | 708/203 |
| 2014/0101485 A1* | 4/2014 | Wegener ........... | H03M 7/3079 |
| | | | 714/E11.178 |
| 2019/0182216 A1* | 6/2019 | Gulak ............... | H04L 63/0414 |

OTHER PUBLICATIONS

"Private federated learning on vertically partitioned data via entity resolution and additively homomorphic encryption"; Stephen Hardy et al.; rxiv .org, Cornell University Library, 201 Olin Library Cornell University Ithaca, NY 14853, Nov. 29, 2017 (Nov. 29, 2017), XP081298056; 60 pages.

* cited by examiner

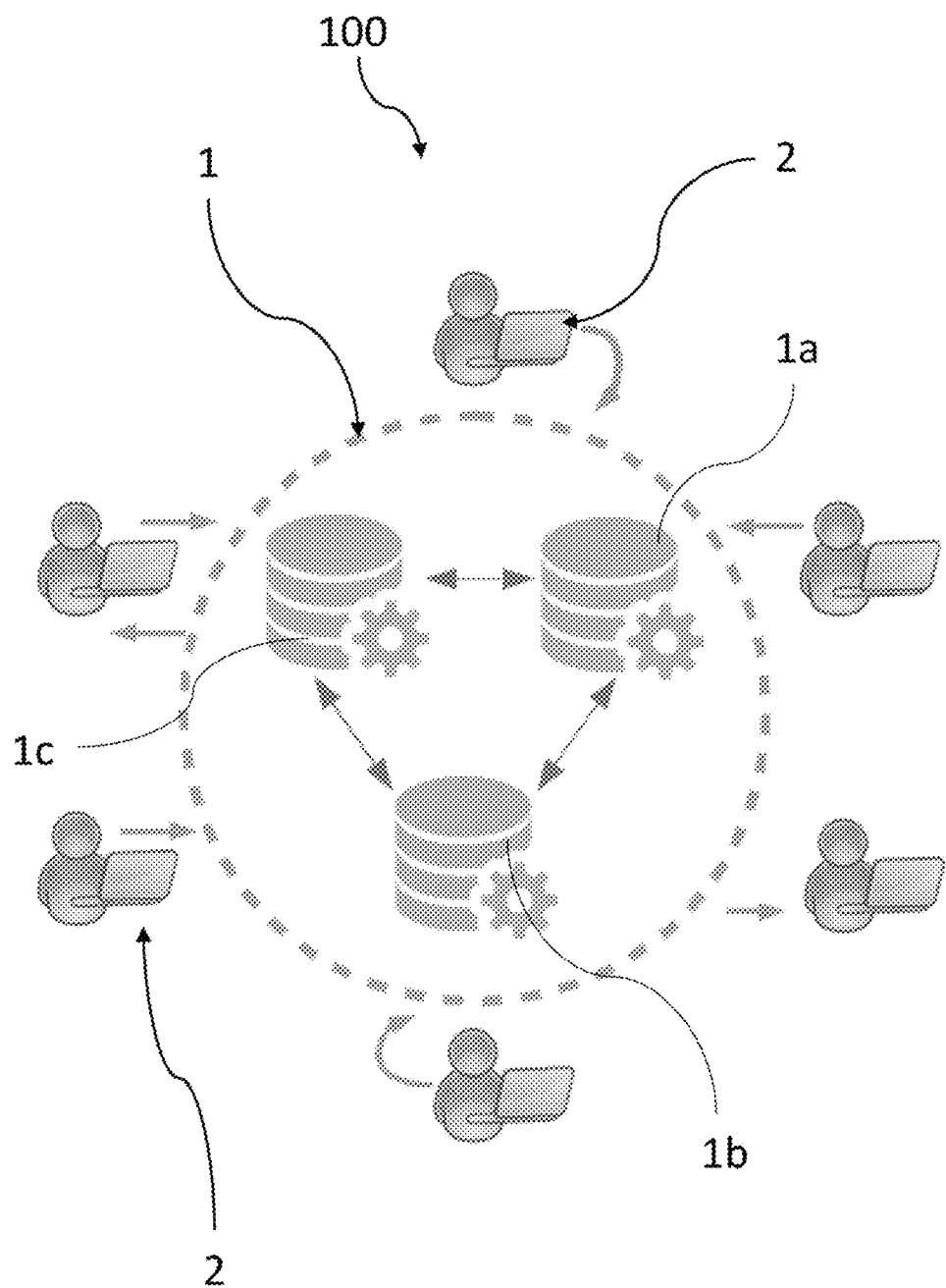

MULTIPARTY COMPUTATION METHOD

TECHNICAL FIELD

The present invention relates to a method of secure and encrypted processing of a plurality of data provided by one or more users. In particular, the method of the present invention implements a series of steps that can optimize encryption of data sent by the users.

The present invention further relates to a system that is able to carry out the steps of the multi-party computation method.

BACKGROUND ART

Multi-party computation (MPC) is known to be used in the state of the art for secure computation of known public functions on private data shared by a plurality of users. In particular, multi-party computation can define a system and a series of actions that a user must take to achieve the execution of a public function without disclosing his/her own data.

Some prior art methods of multi-party computation are configured to perform computation on two servers following multi-party computation protocols such as the Yao Boolean protocol or the GMW arithmetic protocol.

Multi-party computation methods are also known which are configured to perform computation on three servers, such as the Araki protocol as described in WO 2018211676 A1 and WO 2018211675 A1. Further prior art methods of multi-party computation use Beaver triples for data masking, such as the method disclosed in WO2019/046651 A1. On the other hand, Stephen Hardy et al "Private federated learning on vertically partitioned data via entity resolution and additively homomorphic encryption" describes the use of a homomorphic encryption scheme with a public key. This scheme is obtained using two data providers, which receive a plurality of data and keep them secret, and a third element, i.e. a coordinator, configured to manage the public key.

Problem of the Prior Art

Therefore, the known methods are poorly applicable to real cases in which decimal numbers and complex functions are used, as they require high computational costs and times even for the simplest operations of addition and multiplication. It should be noted that the known methods such as the one described in Stephen Hardy et al "Private federated learning on vertically partitioned data via entity resolution and additively homomorphic encryption", using a limited number of data providers (namely only two), reduce the overall security and privacy of managed data and affect the flexibility of the solution. This is because the scheme is obtained using two data providers, which receive a plurality of data and keep them secret, and a third element, i.e. a coordinator, which is configured to manage the public key and not homomorphic encryption or division of the received data. This solution does not envisage the use of any number of data providers or the possibility of carrying out encryption using an additive secret sharing scheme. Therefore, such methods do not provide secure access to the data and, therefore, computation thereon by a plurality of authorized users.

Object of the Invention

The object of the present invention is to provide a method of multi-party computation that can obviate the above discussed drawbacks of the prior art.

In particular, it is an object of the present invention to provide a method that can operate on a wide range of numerical values thereby optimizing computational costs and times. A further object of the present invention is to provide a computation system that can carry out the multi-party computation method.

The aforementioned technical purpose and objects are substantially fulfilled by a method of multi-party computation for processing and secure handling of a plurality of data items associated with one or more users, that comprises the technical features as disclosed in one or more of the accompanying claims.

Advantages of the Invention

Advantageously, the method disclosed herein ensures the privacy of data associated with users.

Advantageously, the method disclosed herein can also operate with decimal numbers while reducing computational costs.

Advantageously, the method disclosed herein provides security against passive attacks, i.e. passive security or security against honest-but-curious adversaries.

BRIEF DESCRIPTION OF FIGURES

Further features and advantages of the present invention will result more clearly from the illustrative, non-limiting description of a preferred, non-exclusive embodiment of a method and a system of multi-party computation as shown in the annexed drawings, in which:

FIG. 1 shows a multi-party computation system that is used to implement the multi-party computation method of the present invention.

DETAILED DESCRIPTION

Even when this is not expressly stated, the individual features as described with reference to the particular embodiments shall be intended as auxiliary to and/or interchangeable with other features described with reference to other exemplary embodiments.

The present invention relates to a method of multi-party computation for processing and secure handling of a plurality of data associated with one or more users. In particular, the multi-party computation method is configured to allow one or more users to share data and keep it private, therefore inaccessible to other users and third parties having interest in such data. The multi-party computation method is also configured to process shared data according to public functions when requested by one or more users. In particular, the multi-party computation method of the present invention uses Additive Secret Sharing to protect and hide information, as described below. More in detail, the multi-party computation method employs a plurality of "untrusted" machines to play the role of "trusted" servers.

The multi-party computation method of the present invention comprises a series of steps as set forth below.

The method comprises the step of providing a predetermined multi-party computation algorithm which is configured to manage data associated with users and perform secure computation thereon.

The method comprises the step of providing a first data processing unit 1 configured to receive one or more first datasets, processing each first dataset according to a reference function and generating a respective result for each reference function, sending the result to a second data processing unit 2 that requested it to be sent and executing the predetermined multi-party computation algorithm. Preferably, the predetermined multi-party computation algorithm resides at least in the first data processing unit 1 to manage each first dataset received in the data processing unit 1 and to perform secure computations on the first received datasets according to public reference functions stored in the first data processing unit. More preferably, the predetermined multi-party computation algorithm also resides in each second data processing unit 2 to load and update the first dataset that has been sent and to request evaluation of reference functions. More in detail, when the first data processing unit 1 is in signal communication with one or more second data processing units 2, the multi-party computation algorithm is configured to allow each first dataset to be sent by the user and require secure computation of public reference functions.

For example, the predetermined multi-party computation algorithm is embodied by one or more software components installed in the first data processing unit 1. in each second data processing unit 2 to put the first data processing unit 1 in signal communication with each second data processing unit 2. Preferably, for each second data processing unit 2, the software provides a user interface through which the user can access the execution of the predetermined multi-party computation algorithm to:

send the first dataset;
request execution of a reference function,
receive the results of the required functions,
decrypt these results.

It should be noted that the language of the multi-party computation algorithm is to one of the languages for programming multi-party computation algorithms known to the skilled person.

Preferably, the first data processing unit 1 comprises a first server 1a, a second server 1b and a third server 1c in signal communication with one another and configured to provide secure and encrypted handling of each first dataset.

Each server 1a, 1b, 1c is defined in the art as "untrusted". Therefore, each server 1a, 1b, 1c is configured to receive and manage each first encrypted dataset according to the predetermined multi-party computation algorithm. Also, according to the multi-party computation algorithm, the servers 1a, 1b 1c are prevented from cooperating together to decrypt each first dataset that has been received. This feature is known to the skilled person as a "non-colluding" server. Furthermore, each server 1a, 1b, 1c is always on-line and in signal communication with each second data processing unit 2.

In particular, the data processing unit 1 receives the first encrypted datasets, performs encrypted processing thereof with the predetermined multi-party computation algorithm so that none of the servers 1a, 1b, 1c will have a first complete dataset and the result of the reference function in plain form. More in detail, each server 1a, 1b, 1c is configured to send the result encrypted with the multi-party computation algorithm to a second data processing unit 2 requiring the first data processing unit 1 to execute a reference function. Then, this result is decrypted by said second data processing unit 2. More in detail, the result is decrypted by means of the predetermined multi-party computation algorithm when the second data processing unit 2 is in signal communication with the first data processing unit 1.

For the purposes of the present invention, the multi-party computation method follows a multi-party computation model known to the skilled person as a "served-aided" model. Thus, the multi-party computation method ensures the privacy of each first dataset sent by a user to the first data processing unit 1. Specifically, the "server-aided" model, comprising three untrusted but non-colluding servers 1a, 1b, 1c, allows:

each user to send a first secret dataset to perform the computation in the first data processing unit 1;
each of the servers 1a, 1b, 1c to receive the first datasets encrypted with the predetermined multi-party computation algorithm to perform computation.

In addition, the "server-aided" model provides the definition of one or more reference functions for processing the first datasets. In other words, public reference functions can be entirely or partially encrypted by a user to increase the computation security.

By way of example, the parameters derived by training (in case of machine learning) and/or possibly by calibration of these functions, may not be disclosed.

Advantageously, each server 1a, 1b, 1c provides the computing resources required to perform the predetermined multi-party computation algorithm, preventing processing on the first datasets from taking place in a second data processing unit 2.

Advantageously, each user may establish signal communication with the first data processing unit 1 via the corresponding second data processing unit 2.

Advantageously, the multi-party computation method provides passive security against possible intrusion attempts by third parties.

The method comprises the step of sending by at least one user at least one first dataset to the first data processing unit 1 via the respective second data processing unit 2, distinct from the first data processing unit 1. It should be noted that each second data processing unit 2 is in signal communication with the first data processing unit 1. According to a preferred embodiment, each second data processing unit is a terminal, a personal computer or a mobile device. In particular, the first data processing unit 1 and a second data processing unit 2 are set in signal communication by means of an application and/or a web page that can be accessed by the user from the second data processing unit 2.

Each first dataset associated with the user comprises one or more encrypted numerical values. By way of example, the first dataset may contain bank data for "privacy preserving."

The step of sending the first dataset comprises the substeps of detecting the presence of decimal numerical values and integer numerical values among the numerical values of the first dataset. Later, the step of sending the first dataset comprises the substep of associating a mantissa, preferably comprising integers, and an exponent of a floating-point form, with each decimal numerical value that has been detected. In particular, each decimal number a can be represented by an integer b, known as mantissa, and a natural number e, known as exponent, in a base ten floating-point format:

$$a = b \cdot 10^{-e}$$

In other words, when a decimal point number is present in the first dataset associated with a user, this number is converted to the above base ten floating-point format. It should be noted that the exponent may change for each decimal number, since the latter is not fixed.

Next, the step of sending the first dataset comprises the substep of encrypting each integer numerical value and each mantissa using the predetermined multi-party computation algorithm. It should be noted that each exponent associated with a decimal number is kept plain and unencrypted.

Advantageously, the computational cost for encryption of decimal numbers is lower than the computational cost required to encrypt both the mantissa and the exponent.

Advantageously, limiting encryption to the mantissa and sending the exponent in plain form avoids the problem of storage overhead.

The multi-party computation method comprises the step of processing each first dataset that has been sent with at least one reference function residing in the first data processing unit 1 to generate a respective encrypted result for each reference function.

The step of processing each first dataset comprises a substep of initializing the first data processing unit 1. Preferably, during initialization, the servers 1a, 1b, 1c perform mutual control on the reference parameters such as the reference functions and/or a reference function loading. In addition, the servers 1a, 1b, 1c perform a mutual synchronization using a global key. In particular, during synchronization, each server 1a, 1b, 1c selects a global key and provides it to the next server using a ring communication. More preferably, the global key is selected using an encryption function known as Advanced Encryption Standard (AES). It should be noted that this encryption function can be used in the predetermined multi-party computation algorithm to perform the encryption substeps.

Preferably, the step of processing each first dataset comprises the substeps of:
sharing each exponent with each server 1a, 1b, 1c while keeping the exponent in plain form,
dividing the encrypted numerical values and the encrypted mantissas of each first dataset among the servers 1a, 1b, 1c according to the predetermined multi-party computation algorithm.

More preferably, the step of processing each first dataset comprises the additional substeps of executing the multi-party computation algorithm in each server 1a, 1b, 1c to:
linearly combine the numerical values, the mantissas and the exponents that have been sent to said first data processing unit according to the at least one reference function;
multiply the numerical values, the mantissas and the exponents that have been sent to said first data processing unit according to the at least one reference function.

For example, for linear combination, each server, designated as $S_i$, carries out the following steps on two shared values a and b and on two public values $\alpha, \beta \in Z_{2^k}$ (whereas x,y and z are random values according to the present invention):
each server shares $(x_i, a_i)$ and $(y_i, b_i)$;
calculating $z_i = \alpha x_i + \beta y_i \mod 2^k$ and $c_i = \alpha a_i + \beta b_i \mod 2^k$;
storing the pair $(z_i, c_i)$.

On the other hand, for multiplication, each server, designated as $S_i$, carries out the following steps on two shared values a and b, with j as a public identifier of multiplication (whereas x, y and z are random values according to the present invention):
each server shares $(x_i, a_i)$ and $(y_i, b_i)$;
calculating $\alpha_i = F(k_i, a_i) - F(k_{i-1}, a_i) \mod 2^k$ and $r_i = (1/3)(a_i b_i - x_i y_i + \alpha_i) \mod 2^k$;
sending $r_i$ to $S_{i+1}$;
calculating $z_i = r_{i-1} - r_i \mod 2^k$ and $c_i = -2r_{i-1} - r_i \mod 2^k$;
storing the pair $(z_i, c_i)$.

In other words, the first datasets are processed by linear combinations and multiplications defined by the reference functions according to the multi-party computation algorithm to carry out the operations on encrypted numerical values.

More preferably, the step of processing each first dataset comprises the additional substeps of executing the multi-party computation algorithm in each server 1a, 1b, 1c to:
securely compare the numerical values, the mantissas and the exponents that have been sent to said first data processing unit with a reference value;
securely compare one or more numerical values, mantissas and exponents in first datasets associated with two distinct users;
securely compare one or more numerical values, mantissas and exponents in first datasets associated with one user.

According to a preferred embodiment, the comparison substeps lead to the creation of decision trees. In particular, each comparison substep may have:
a successful outcome when a numerical value satisfies a comparison condition with a compared numerical value, such as the reference value and/or a numerical value of a first dataset,
a failure when a numerical value does not satisfy the comparison condition with a compared numerical value, such as the reference value and/or a numerical value of a first dataset.

Specifically, the comparison condition may be an equality or an inequality such as, for example, the numerical value A being equal or not to a compared numerical value such as ten, or the numerical value A is more/less than a compared numerical value such as ten.

As a result, the successful outcomes and failures of the comparison substeps can securely lead to a decision tree and this tree can be sent to the requesting user using the predetermined multi-party computation algorithm. According to the present invention, the one or more decision trees are created by means of a Boolean logic known to the skilled person.

Preferably, the substeps of comparing and performing linear combinations, multiplications or a combination thereof are carried out sequentially or in parallel when possible. It should be noted that the substeps of performing comparisons are also carried out sequentially or in parallel when possible. More preferably, the substeps of performing operations and comparisons or a combination thereof are carried out sequentially or in parallel when possible. In particular, the predetermined multi-party computation algorithm is configured to recognize parallelizable substeps of performing and comparing. In other words, the predetermined multi-party computation algorithm performs in parallel the comparison, linear combination and multiplication operations that are independent of the outcome of the previous operation.

Advantageously, parallelization reduces the computation times required to execute the reference functions and to create the decision trees.

Advantageously, the method of the present invention finds application in the management of any category of protected data, such as for example financial data managed by banks.

The multi-party computation method comprises a step of requiring the first data processing unit 1 to send the result via a second processing unit. Then, the multi-party computation method comprises a step of sending the result via the first data processing unit 1 to the second data processing unit 2 which requested it to be sent.

It should be noted that a user may send the first dataset to the first data processing unit 1 and/or request computation of a public reference function.

In other words, the multi-party computation method puts multiple users in communication with the first data processing unit 1, thereby allowing a user to quickly and securely compute public reference functions on data sent by other users without necessarily sending his/her private data to the first data processing unit.

Preferably, the step of requesting data to be sent comprises the substep of establishing signal communication between the second data processing unit 2 and the first processing unit via the second data processing unit 2 by accessing an application and/or a site. The subsequent step of sending the result to said second data processing unit 2 via the first data processing unit 1 also includes sending a request for calculation of a reference function to obtain the result.

In particular, the substep of establishing signal communication is carried out securely.

The multi-party computation method comprises a step of decrypting the result sent to said second data processing unit 2 using the predefined multi-party computation algorithm.

Preferably, the predetermined multi-party computation algorithm is configured to execute one or more sub-protocols. The latter, as known from the state of the art, are programs/algorithms that can be executed within a more complex algorithm. Specifically, the sub-protocols comprise a plurality of instructions to be executed.

In particular, the predetermined multi-party computation algorithm is configured to execute:
a first sub-protocol comprising an Araki protocol configured to perform integer encryption and linear combination and multiplication operations on said encrypted is integers (as set forth in Toshinori Araki, Jun Furukawa, Yehuda Lindell, Ariel Nof, and Kazuma Ohara. *High-throughput semi-honest secure three party computation with an honest majority.* In Edgar R. Weippl, Stefan Katzenbeisser, Christopher Kruegel, Andrew C. Myers, and Shai Halevi, editors, ACM CCS 2016: 23rd Conference on computer and Communications Security, pages 805-817. ACM Press, October 2016);
a second sub-protocol comprising a bit-decomposition protocol configured to perform comparison between encrypted integers (as set forth in Toshinori Araki, Aci Barak, Jun Furukawa, Marcel Keller, Yehuda Lindell, Kazuma Ohara, and Hikaru Tsuchida. *Generating the SPDZ compiler for other protocols.* In David lie, Mohammad Mannan, Michael backs, and XiaoFeng Wang, editors, ACM CCS 2018: 25th Conference on computer and Communications Security, pages 880-895. ACM Press, October 2018).

In particular, the Araki Protocol may be divided into three parts:
Preprocessing: the servers 1*a*, 1*b*, 1*c* are put in signal communication and perform mutual control on the reference parameters such as reference functions. During preprocessing, the servers are synchronized using a global key for each server. Each global key is sampled by a set associated with a preferably public security parameter and associated with the second data processing unit in communication with the first data processing unit 1;
Secret-sharing: each user encrypts the first dataset associated therewith and sends the first dataset to the data processing unit. This part is based on the "replicated secret-sharing" technique known to the skilled person.

In particular, a pseudo-random encryption function, such as the Advanced Encryption Standard function, receives each global key at its input, and defines a set of secure values that can be selected to generate a triplet x1, x2, x3 under the condition x1+x2+x3=0 mod $2^k$. This random triplet is used by each user to encrypt the first dataset with which it is associated to send it to the data processing unit. More in detail, during secret-sharing each numerical value v in a first dataset is sent as a1=x3-v, a2=x1-v, a3=x2-v in a loop to the first server 1*a*, the second server 1*b* and the third server 1*c* respectively, with the values of the triplet x1, x2, x3. In other words, once encryption has been completed, each second data processing unit 2 sends a pair of values to each server and namely:
the pair of values a1, x1 to the first server 1*a*,
the pair of values a2, x2 to the second server 1*b*,
The pair of values a3, x3 to the third server 1*c*;
Secure computation: assuming that the servers 1*a*, 1*b*, 1*c* have received the first datasets that have been sent, each customer may request evaluation/execution ofthe reference functions. In particular, each server 1*a*, 1*b*, 1*c* executes linear combinations and multiplications according to the reference function.

With the bit-decomposition protocol secure comparison can be performed, with a numerical value compared to a reference value, namely zero (less-than-zero comparison). More in detail, the bit-decomposition protocol can:
determine whether a value A is less or more than zero;
determine whether a value A is less or more than another value B, and determine whether their difference is less or more than zero,
determine whether a value A is equal to a value B.

More preferably, the predetermined multi-party computation algorithm is configured to execute a third sub-protocol to perform encryption of integers and decimal numbers, and linear combination, multiplication, and comparison operations on integer and decimal numbers. Preferably, the linear combination, multiplication, and comparison operations can sum, subtract, multiply, divide and compare the relevant encrypted and unencrypted numbers. For example, the above operations are carried out using the above mathematical formulas in association with the steps of executing the predetermined multi-party computation algorithm in each server 1*a*, 1*b*, 1*c*.

In particular, the third sub-protocol defines the above discussed random triplet x1, x2, x3, and associates a mantissa and an exponent with a detected decimal number. Thus, once encryption has been completed, the third sub-protocol sends the exponent along with the pairs of values. More in detail, the third sub-protocol is configured to send the following values to each server 1*a*, 1*b*, 1*c*, via the second data processing unit 2:
x1, a1, e to the first server 1*a*,
x2, a2, e to the second server 1*b*,
x3, a3, e to the third server 1*c*.

A further object of the present invention is a multi-party computation system 100 for carrying out the above-described multi-party computation method. This multi-party computing system 100 comprises:
a first data processing unit 1 configured to:
receive a first dataset;
processing each first dataset according to a reference function and generating a respective result for each reference function;
executing a predetermined multi-party computation algorithm residing in the first data processing unit 1;

Furthermore, the multi-party computing system 100 comprises a second data processing unit 1 associated with each user and in signal communication with the first data processing unit 1.

Preferably, the first data processing unit comprises a first server 1a, a second server 1b and a third server 1c, each in signal communication with the others. According to a preferred embodiment, each server 1a, 1b, 1c has the features as set forth above.

More preferably, the multi-party computation system 100 comprises a MPC engine, called the MPC-Engine prototype. In particular, the MPC engine comprises three components:

- a MPC language, also known as mpc-lang, which is configured to manage and process the first datasets sent to the data processing unit. In addition, the mpc-lang language is used as a language for programming reference functions.
- a first software component, also known as mpc-server, configured to implement and execute the predetermined multi-party computation algorithm and the protocols and sub-protocols associated therewith. In particular, the first software component is installed in each of the servers 1a, 1b, 1c and is used to perform secure computation of reference functions such as key exchange, linear combinations, secure multiplications and comparisons;
- a second software component, also known as mpc-client-cli, installed in each second data processing unit and configured to:
    - securely send each first dataset in compliance with the predetermined multi-party computation algorithm,
    - encrypt the first dataset;
    - establish communication between each second processing unit data and the first data processing unit
    - request evaluation of a reference function stored and/or residing in the first data processing unit,
    - define one or more reference functions, and namely define whether these reference functions are partially or totally encrypted. For example, a user may encrypt certain parameters of the functions such as the weights of a linear regression.

More preferably, the MPC engine comprises a converter which uses the model produced by scikit-learn training, to generate an evaluator written in the mpc-lang. This conversion results in a useful support for classifiers and regressors based on:

Decision trees
Random Forest (collections of trees).

In other words, the MPC engine converter affords automatic conversion and facilitates the use of the prototype for data scientists having no MPC skills.

Application Example

Random Forests

A random forest is an extension of a simple decision tree. In particular, a random forest is a model obtained from a combination of simple decision trees "trained" with sets of random characteristics. This random forest is used in classification models, for example.

The multi-party computation method of the present invention can provide a random forest based on the first datasets sent by each user to the data processing unit. In particular, the multi-party computation algorithm is configured to:

evaluate each decision tree in the random forest by parallelizing operations, and
combine each decision tree.

Advantageously, the multi-party computation method reduces the computation time to create a random forest.

The invention claimed is:

1. A method of multi-party computation for processing and secure handing of a plurality of data associated with one or more users, said method comprising the steps of:
    providing a predetermined multi-party computation algorithm;
    sending, for at least one user, at least one first dataset to a first data processing unit comprising a first server, a second server, and a third server in signal communication with one another and configured to provide secure and encrypted handling of each first dataset via a respective second data processing unit distinct from said first data processing unit and in signal communication with said first data processing unit; each first dataset being associated with said at least one user and comprising one or more encrypted numerical values;
    processing each first dataset thus sent with at least one reference function residing in said first data processing unit to generate a respective encrypted result for each reference function;
    requesting said first data processing unit to send said encrypted result via the second data processing unit;
    sending said encrypted result via the first data processing unit to said second data processing unit which requested the encrypted result it to be sent;
    characterized in that the step of sending said first dataset comprises substeps of:
        detecting the presence of decimal numerical values and integer numerical values between said numerical values of said first dataset;
        associating a mantissa and an exponent of a floating-point representation with each decimal numerical value that has been detected;
        encrypting each integer numerical value and each mantissa using said predetermined multi-party computation algorithm.

2. The method of multi-party computation as claimed in claim 1, further comprising:
    providing said first data processing unit configured to:
        receive said first datasets;
        process each first dataset according to said at least one reference function to generate a respective result for each reference function;
        execute said predetermined multi-party computation algorithm residing in said first data processing unit;
        send said result for each reference function to said second data processing unit which requested the result for each reference function to be sent.

3. The method of multi-party computation as claimed in claim 1 wherein the step of processing each first dataset comprises substeps of:
    sharing each exponent with each of said first server, said second server and said third server while keeping said exponent in plain form,
    dividing the encrypted numerical values and encrypted mantissas of each first dataset among the first server, the second server, and the third server according to said predetermined multi-party computation algorithm.

4. The method of multi-party computation as claimed in claim 3 wherein the step of processing each first dataset further comprises the following additional substeps, to be carried out sequentially or in parallel as a function of the method of multi-party computation:
    executing said predetermined multi-party computation algorithm in each of the first server, the second server, and the third server to linearly combine the numerical values, the mantissas and the exponents that have been sent to said first data processing unit according to the at least one reference function;

executing said predetermined multi-party computation algorithm in each of the first server, the second server, and the third server to multiply the numerical values, the mantissas and the exponents that have been sent to said first data processing unit according to the at least one reference function.

5. The method of multi-party computation as claimed in claim 3, wherein the step of processing each first dataset further comprises the following additional substeps, to be carried out sequentially or in parallel as a function of the method of multi-party computation:

executing said predetermined multi-party computation algorithm in each of the first server, the second server, and the third server to securely compare the numerical values, the mantissas and the exponents that have been sent to said first data processing unit with a reference value;

executing said predetermined multi-party computation algorithm in each of the first server, the second server, and the third server to securely compare one or more numerical values, mantissas and exponents in the first datasets associated with two distinct users;

executing said predetermined multi-party computation algorithm in each of the first server, the second server, and the third server to securely compare one or more numerical values, mantissas and exponents in the first datasets associated with one user.

6. The method of multi-party computation as claimed in claim 1, characterized in that the method further comprises a step of decrypting the result that has been sent to said second data processing unit according to said predetermined multi-party computation algorithm.

7. The method of multi-party computation as claimed in claim 1 wherein said predetermined multi-party computation algorithm is configured to execute one or more sub-protocols.

8. The method of multi-party computation as claimed in claim 7, wherein said predetermined multi-party computation algorithm is configured to execute:

a first sub-protocol comprising a protocol by Araki, configured to perform integer encryption and linear combination and multiplication operations between said encrypted integers;

a second sub-protocol comprising a bit-decomposition protocol configured to perform comparison between encrypted integers.

9. The method of multi-party computation as claimed in claim 7, wherein said predetermined multi-party computation algorithm is configured to execute:

a sub-protocol to perform encryption of integer and decimal numbers, and linear combination, multiplication, and comparison of integer and decimal numbers.

10. A multi-party computation system for carrying out a method of multi-party computation, the system comprising:

one or more processors and one or more memories for storing instructions executed by the one or more processors to process the method comprising the steps of:

providing a predetermined multi-party computation algorithm;

sending, for at least one user, at least one first dataset to a first data processing unit comprising a first server, a second server, and a third server in signal communication with one another and configured to provide secure and encrypted handling of each first dataset via a respective second data processing unit distinct from said first data processing unit and in signal communication with said first data processing unit; each first dataset being associated with said at least one user and comprising one or more encrypted numerical values;

processing each first dataset thus sent with at least one reference function residing in said first data processing unit to generate a respective encrypted result for each reference function;

requesting said first data processing unit to send said encrypted result via the second data processing unit;

sending said encrypted result via the first data processing unit to said second data processing unit which requested the encrypted result to be sent;

characterized in that the step of sending said first dataset comprises sub-steps of:

detecting the presence of decimal numerical values and integer numerical values between said numerical values of said first dataset;

associating a mantissa and an exponent of a floating-point representation with each decimal numerical value that has been detected;

encrypting each integer numerical value and each mantissa using said predetermined multi-party computation algorithm.

* * * * *